No. 890,339. PATENTED JUNE 9, 1908.
J. W. COOPER.
NUT LOCK.
APPLICATION FILED AUG. 24, 1907.
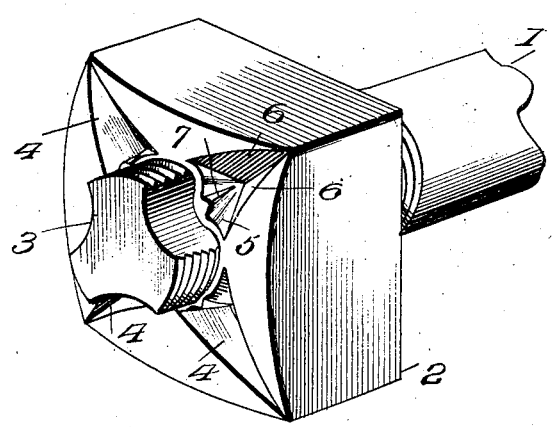
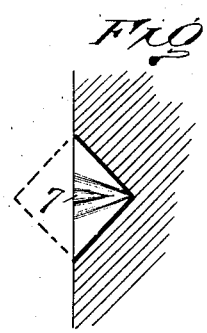
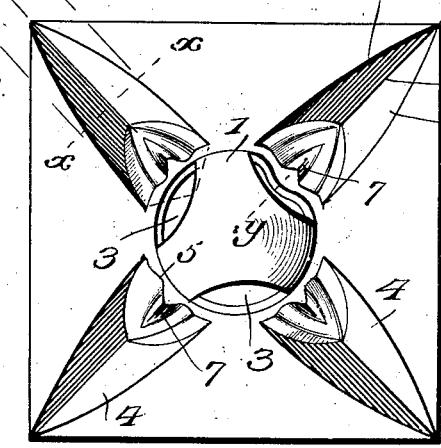
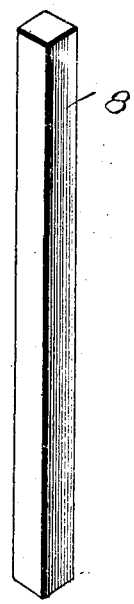
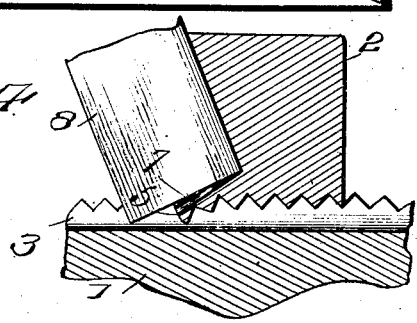
Inventor
John W. Cooper
Witnesses
By
Attorneys

NDC# UNITED STATES PATENT OFFICE.

JOHN W. COOPER, OF BOSTON, MASSACHUSETTS.

NUT-LOCK.

No. 890,339.

Specification of Letters Patent.

Patented June 9, 1908.

Application filed August 24, 1907. Serial No. 389,991.

*To all whom it may concern:*

Be it known that I, JOHN W. COOPER, a citizen of the United States, residing at Dorchester Station, Boston, in the county of Suffolk and State of Massachusetts, have invented certain new and useful Improvements in Nut-Locks, of which the following is a specification.

My invention aims to prevent the loosening of nuts of railway, bridge and like structural fastenings, also on all rolling stock of steam and electric railroads where the loss of a nut might cause a terrible accident and on all carriages, automobiles, wagons and the like, which are subject to vibration, thereby avoiding the vigilance necessary to keep such fastenings in proper position when tightened, while providing a construction enabling of their repeated use.

The invention relates to a fastening in which the rod or bolt has a groove lengthwise of its threaded portion and intersecting threads thereof, and a nut adapted to screw upon the threaded portion of the rod or bolt and provided with a thin bendable portion which, after the nut has been tightened, is adapted to be pressed into the groove of the rod or bolt and lock the nut thereon.

The invention consists of a projection formed on the outer side of the bendable lock portion of the nut to receive the blow expended to indent the said bendable portion and cause it to enter the groove of the rod or bolt.

The invention also consists of a recess of peculiar formation provided in the outer face of the nut and having opposite walls forming guides to fix the position of a punch and prevent lateral displacement thereof, the inner wall of said recess being adjacent to the bolt opening and sufficiently thin to be readily bent and provided upon its outer side with the projection, which, when subjected to force, as by the delivery of a blow thereon, causes the thin wall separating the recess from the bolt opening, to be pressed into the latter and enter a groove in the side of the rod or bolt.

Referring to the drawings forming a part of the specifications: Figure 1 is a perspective view of the threaded portion of a rod or bolt, having a nut mounted thereon and embodying the invention. Fig. 2 is a front view of the nut and the rod or bolt upon which the same is mounted and secured, the dotted lines indicating the position of the punch employed for insuring proper application of the blow to the bendable lock portion of the nut. Fig. 3 is a sectional view of a corner portion of the nut on the line $x$—$x$ of Fig. 2, looking towards the bolt opening. Fig. 4 is a sectional view of a portion of the nut and the rod or bolt on the line $y$—$y$ of Fig. 2. Fig. 5 is a detail perspective view of the punch.

Corresponding and like parts are referred to in the following description and indicated in all the views of the drawings by the same reference characters.

In the drawings, the numeral 1 indicates a rod or bolt or like fastening having a threaded portion, and 2 a nut coöperating therewith and having an opening interiorly threaded to match the screw threads of the rod or bolt 1. One or more grooves 3 are formed in a side of the rod or bolt 1 and intersect the threads thereof, and are adapted to receive the bendable lock portion of the nut 2 when the same has been made secure when tightened.

The nut 2 is provided in its outer side or face with one or more recesses 4, which are approximately of triangular form and gradually deepen from the outer to the inner end, the inner wall 5 being comparatively thin and bendable and separating the recess 4 from the bolt opening. The outer face of the wall 5 slopes with the result that the wall 5 gradually increases in thickness from its outer end towards the bottom of the recess, thereby providing ample metal to withstand the strain incident to the turning of the nut when the structure to which the fastening is applied is subjected to vibration. The side walls 6 of the recess or recesses are angularly disposed, being preferably arranged at a right angle so as to engage with the adjacent sides of a punch having a rectangular cross sectional outline so as to prevent side displacement thereof when delivering a blow thereon to indent or cause the wall 5 to enter the groove 3 of the fastening member 1. A rib or projection 7 is formed medially of the outer side of the bendable wall or lock portion 5, and its sides or faces outwardly converge to form an edge against which the inner end of a punch or like tool 8 may bear when applying the force of the blow to deflect the bendable portion 5 into the groove 3 to lock the nut 2. The outer face of the nut is made convex and the recess or recesses 4 are formed in the corners thereof where the greatest amount of metal is located, thereby enabling a recess of maximum dimensions being provided without materially weakening the nut. The recess or recesses may be formed in any manner, either by stamping, drop forging or casting, or in any way that may be found most economical and advantageous in the manufacture of the nuts. The shape of the recess 4 is such as to admit of its ready formation in any manner. The location of the recess in a corner of the nut is particularly advantageous since the side walls 6 are of maximum length and give proper direction and firm support to the punch 8 when delivering a blow on the outer end thereof to indent the bendable or lock wall 5. The punch or tool 8 may consist of a bar of steel of square form in cross section, and said punch may be used with any one of its corners at either end fitted in the recess whose inner wall 5 comes opposite to a groove 3 in the rod or bolt 1 after the nut has been tightened, so that the delivery of a blow upon said punch will indent said wall and cause it to enter the groove and thereby form a lock which will prevent casual loosening of the nut by vibration of the structure to which the fastening may be applied. The projection 7 insures application of the force at a central point without any especial care on the part of the workman, and any tool may be employed so as to direct the force of the blow upon the projection, the punch illustrated being preferable as the blow is equalized and side draft prevented because the angularly disposed walls 6 of the recess serve as guides to hold the punch in proper position when raining a blow thereon. The projection or rib 7, in addition to insuring positive and certain application of the force expended to bend or dent the lock portion 5, also serves to stiffen and brace said lock portion, while the thin portions of the wall 5 at opposite sides thereof, admit of the wall yielding under the force of the blow directed thereupon when bending the same inward into the groove 3.

Having thus described the invention, what is claimed as new is:

1. In a lock nut, the combination of a rod or bolt having a groove intersecting its threaded portion, and a nut mounted upon the threaded portion of the rod or bolt and having a recess in its outer face of approximately triangular form and gradually deepening from its outer to its inner end the side walls of the recess being arranged at a right angle to each other, and having the wall separating the recess and bolt opening comparatively thin and bendable and increased in width from the bottom of the recess towards the outer open side thereof and having a rib or projection upon the side of said bendable wall facing the said recess and adapted to brace the said wall and to insure proper application of the blow expended for pressing the aforementioned bendable wall into the groove of the rod or bolt.

2. In combination, a rod or bolt having longitudinal grooves in its sides intersecting the threads thereof, and a nut having a threaded opening to receive the said rod or bolt, and having triangular shaped recesses in its outer side opposite the corners, each of said recesses being separated from the threaded bolt opening by a bendable wall provided with a centrally disposed tapered rib on the side facing the recess to brace said wall and receive the blow expended to press the said bendable wall into a groove of the bolt or rod, and having the side walls of the recess arranged relatively at a right angle to engage with adjacent sides of a square punch to direct the same and to prevent slipping and enable either of the four corners of the punch being used.

In testimony whereof I affix my signature in presence of two witnesses.

JOHN W. COOPER. [L. S.]

Witnesses:
V. B. HILLYARD,
W. N. WOODSON.